UNITED STATES PATENT OFFICE.

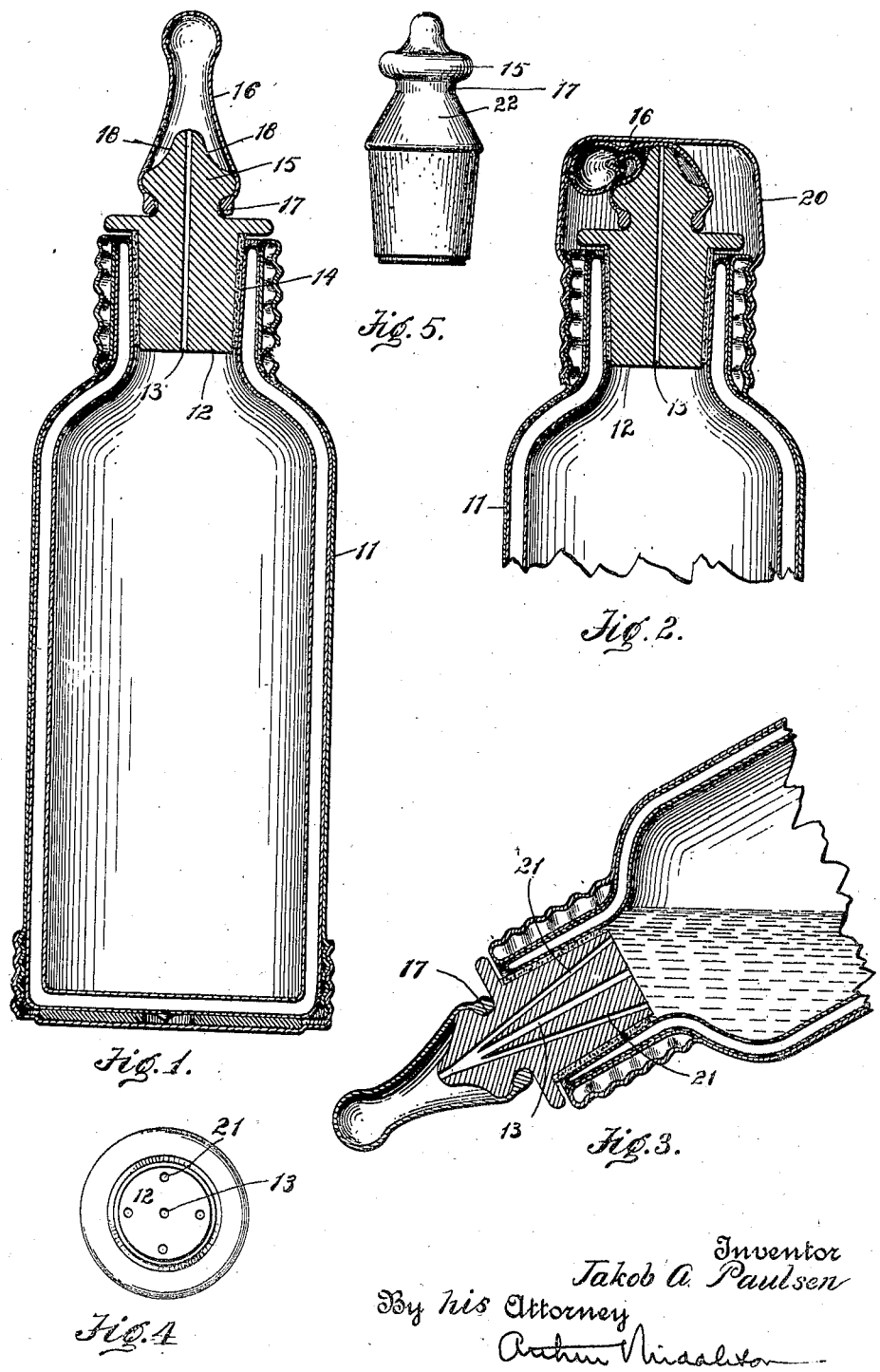

JAKOB A. PAULSEN, OF JERSEY CITY, NEW JERSEY.

HEADED STOPPER.

1,425,539.  Specification of Letters Patent.  Patented Aug. 15, 1922.

Application filed March 18, 1920. Serial No. 366,819.

*To all whom it may concern:*

Be it known that I, JAKOB A. PAULSEN, a citizen of the United States of America, residing at Jersey City, New Jersey, have invented new and useful Improvements in Headed Stoppers, of which the following is a specification.

This invention relates to a stopper adapted to carry a nipple for converting a relatively wide mouthed milk container into a nursing bottle.

The invention consists essentially in an apertured stopper to which a nipple may be readily attached and detached and with which a covering cap for the milk container may co-act with the nipple to close the aperture when the cap, nipple and stopper are in their respective positions in or on the bottle.

I have illustrated the preferred embodiment of my invention in the accompanying drawings in which:

Figure 1 shows a vertical sectional view of a milk container with my stopper in place;

Fig. 2 shows a partial sectional view similar to Fig. 1, but with a covering cap in place on the container;

Fig. 3 shows a stopper with several apertures instead of one;

Fig. 4 shows a bottom view of the stopper in Fig. 3;

Fig. 5 shows my stopper with a slightly modified form of neck.

In the drawings, the numeral 11 indicates a milk container—in the instance shown, a thermos bottle. 12 indicates my stopper apertured at 13 and provided with some resilient material 14 to make a tight fit with the neck of the container or bottle.

15 indicates a portion of the stopper (which may or may not be integral therewith) adapted to carry and project into a nipple 16. 17 indicates a groove in which the neck of the nipple is adapted to fit, above which the portion 15 is enlarged and then diminished so that it presents the shape in cross-section substantially that of a spearhead. The faces 18 of the portion 15 form substantially a cone but they are preferably concaved.

When a cap 20 is placed on the bottle as shown in Fig. 2, the nipple is bent over and pressed down by the cap upon the top of the portion 15 of the stopper until the aperture 13 is completely closed. The concave faces 18 provide space for the bending over of the nipple as shown.

In the form shown in Fig. 3, a plurality of apertures 13 and 21 are used to facilitate the withdrawal of the milk from the bottle.

In the form shown in Fig. 5, sloping shoulders 22 are used to facilitate the easy removal of the nipple from the stopper.

It will thus be seen that my stopper permits the placing in a vacuum walled bottle, warm milk for an infant, in the early evening. The nipple can be put in place and when the milk is needed during the night, it is only necessary to remove the cap and the milk and bottle is all ready for the child to use—thereby rendering unnecessary the preparation of the bottle, nipple and milk at that time of the night.

What I claim is:

The combination in a bottle having a neck and a cap adapted to fit on said neck, of a nipple, and a stopper having an aperture therethrough, the top of the stopper projecting from the bottle when in place whereby when the cap is applied to the bottle, the nipple is clamped between the top of the stopper and cap across and closing the aperture in the stopper, said stopper being concave near the top thereof and the nipple being spaced from said concave portion.

In testimony whereof, I have signed my name to this specification, this ninth day of March, 1920.

JAKOB A. PAULSEN.